6334X
G. WILLISTON.
TIN BAKER.
Patented Jan. 11, 1831.
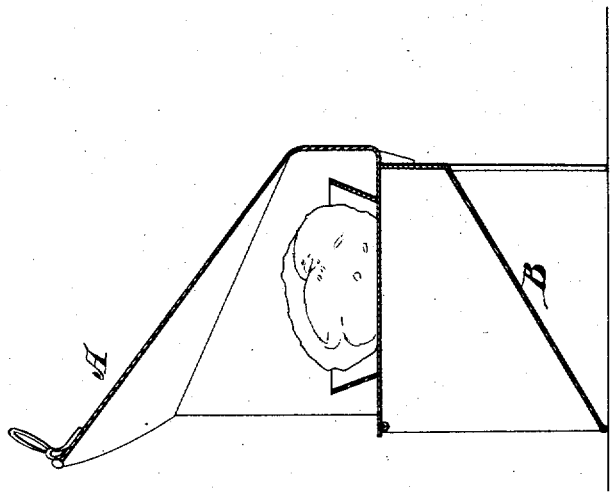
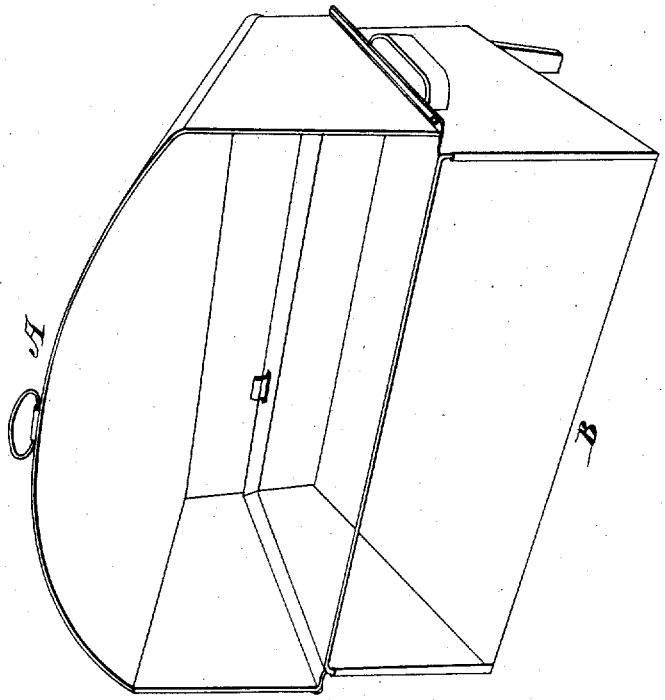
THE NORRIS PETERS CO., PHOTO-LITHO., WASHINGTON, D. C.

Gordon Williston X6334

Letters Patent. (Patented January 11. 1831.)

The schedule referred to in these Letters Patent and making part of the same containing a description in the words of the said Gordon Williston himself of his improvement in the common Tin Baker, —

This is designed as an improvement of the common tin Baker now in use and has in common with that, a pan of sheet iron to contain the bread or other articles to be baked, and the whole upper part of tin, which forms such an angle with the pan as to reflect the heat from the fire before which it is placed, upon the article baked. — All these parts this baker has in common with the baker now in use, and I do not claim to be the inventor of the same nor of any new application of the materials composing the same. In the baker now in use there is a box placed, (below the pan containing the bread, or other articles to be baked) to contain coals or embers for applying heat. The improvement consists in dispensing with the pan of coals, and making the whole lower part of the baker of tin or some other reflecting metallic surface, and the bottom piece elevated, on the back side, at such an angle as to heat the bottom of the pan, by reflection from below, in the same manner as the top is heated now, by reflection from above, It is designed that the baker should be placed before the fire and by the heat received from the fire without coals applied above or below, effectually to bake any articles placed in the pan. The benefits of this improvement are, that the baking is better performed, there being on all sides, an uniform heat and baking every part equally, that it is more convenient and economical particularly in the summer season, as a light fire kindled for a short time will be all that is necessary to bake effectually, and more safe from communicating fire, having no coals connected with them, The lower edge of the lower reflector rests upon the floor or hearth, and the baker is supported on the back side, by two sheet iron legs, designed to keep it in a horizontal position.

What I claim as new, and as my invention, and nothing else

X6334 is simply the substitution of the reflecting surface in the lower part of the frame instead of the box for coals, as in the baker in common use, making thus the "Double reflecting Baker"

Dated at Norwich this 21st day of Dec. A. D. 1830.

Witnesses

A. N. Bardlow

John A. Rickwater

Gordin Willistin

L148 [illegible]